(12) United States Patent
Ma

(10) Patent No.: US 9,568,762 B2
(45) Date of Patent: Feb. 14, 2017

(54) CURVED LIQUID CRYSTAL DISPLAY PANEL AND CURVED LIQUID CRYSTAL DISPLAY DEVICE

(71) Applicant: SHENZHEN CHINA STAR OPTOELECTRONICS TECHNOLOGY CO., LTD., Shenzhen, Guangdong (CN)

(72) Inventor: Chao Ma, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 94 days.

(21) Appl. No.: 14/416,588

(22) PCT Filed: Dec. 16, 2014

(86) PCT No.: PCT/CN2014/093909
§ 371 (c)(1),
(2) Date: Jan. 22, 2015

(87) PCT Pub. No.: WO2016/074310
PCT Pub. Date: May 19, 2016

(65) Prior Publication Data
US 2016/0139458 A1    May 19, 2016

(30) Foreign Application Priority Data

Nov. 13, 2014 (CN) .......................... 2014 1 0639864

(51) Int. Cl.
*G02F 1/1343*    (2006.01)
*G02F 1/1335*    (2006.01)

(52) U.S. Cl.
CPC ... *G02F 1/133514* (2013.01); *G02F 1/133512* (2013.01); *G02F 1/134309* (2013.01)

(58) Field of Classification Search
CPC ..................... G02F 1/134309; G02F 1/133512
See application file for complete search history.

(56) References Cited

U.S. PATENT DOCUMENTS

2015/0116625 A1*   4/2015   Hwang ............. G02F 1/136209
                                                        349/57

\* cited by examiner

*Primary Examiner* — Kendrick Hsu
(74) *Attorney, Agent, or Firm* — Kirton McConkie; Evan R. Witt

(57) ABSTRACT

A curved liquid crystal display panel is disclosed. The curved liquid crystal display panel includes a color filter substrate and an array substrate disposed corresponding to the color filter substrate. The array substrate has pixel electrodes disposed thereon. Each of the pixel electrodes has a first side and a second side. A length of the first side is greater than a length of the second side, and a curved direction of the curved liquid crystal display panel is the same as an extending direction of the first side. In the present invention, the curved direction of the curved liquid crystal display panel is arranged to be the same as a long side of each of the pixel electrodes.

17 Claims, 3 Drawing Sheets

CURVED LIQUID CRYSTAL DISPLAY PANEL AND CURVED LIQUID CRYSTAL DISPLAY DEVICE

BACKGROUND OF THE INVENTION

1. Field of the Invention

The present invention generally relates to a display field, and more particularly to a curved liquid crystal display panel and a curved liquid crystal display device.

2. Description of Prior Art

With the development of technology, curved liquid crystal display devices appear. The curved liquid crystal display devices have better visual experience effect, and thus they are widely utilized. Currently, in a manufacturing process of a curved liquid crystal display device, a display device with a flat structure is manufactured firstly. Then, the curved liquid crystal display device is produced by curving the display device with the flat structure.

A conventional curved liquid crystal display device comprises a curved color filter substrate 11, a curved array substrate 12, and a liquid crystal layer. The liquid crystal layer is disposed between the curved color filter 11 and the array substrate 12. Specific structures of the curved color filter substrate 11 and the curved array substrate 12 are shown in the upper part of FIG. 1.

As shown in the lower part of FIG. 1, a black matrix 112 and color filter photoresists 111 are disposed on the curved color filter substrate 11. The curved array substrate 12 is disposed corresponding to the curved color filter substrate 11 and has pixel electrodes 121 and data lines 122 disposed thereon.

In a flat state, the pixel electrodes 121 of the curved array substrate 12 are disposed corresponding to the color filter photoresists 111 of the curved color filter substrate 11. However, the color filter substrate 11 misaligns with the array substrate 12 during a curved process.

When a curved extent is large, the curved color filter substrate 11 moves relatively to the array substrate 12. The color filter photoresists 111 in a curved position misalign with the pixel electrodes in a corresponding position, and thus a color shift phenomenon occurs. When display device is further curved, a displacement between the color filter substrate 11 and the array substrate 12 is increasing. Two adjacent ones of the color filter photoresists 111 might be shifted to the data lines 122. Since an electric field near the data lines 122 drives liquid crystals to rotate, the light leakage phenomenon occurs.

Consequently, there is a need to provide a curved liquid crystal display panel and a curved liquid crystal display device for solving the above-mentioned problems in the prior art.

SUMMARY OF THE INVENTION

An objective of the present invention is to provide a curved liquid crystal display panel and a curved liquid crystal display device. The color shift phenomenon can be avoided by arranging a curved direction of the curved liquid crystal display panel the same as an extending direction of a long side of pixel electrodes. The technical problems that the color shift phenomenon and the light leakage phenomenon due to the misalignment between the color filter substrate and the array substrate in the curved liquid crystal display panel and the curved liquid crystal display device in the prior art affects the display quality of the liquid crystal display device can be solved.

To solve the above-mentioned problems, a technical scheme of the present invention is described as follows. A curved liquid crystal display panel in accordance with an embodiment of the present invention comprises: a color filter substrate comprising a black matrix and color filter photoresists disposed thereon; an array substrate disposed corresponding to the curved color filter substrate and having pixel electrodes and data lines disposed thereon, wherein each of the pixel electrodes has a first side and a second side, a length of the first side is greater than a length of the second side, and a curved direction of the curved liquid crystal display panel is the same as an extending direction of the first side; and a liquid crystal layer disposed between the color filter substrate and the array substrate, wherein the curved liquid crystal display panel comprises a left area, a middle area, and a right area, the black matrix is widened according to a curved displacement, a widening value of the black matrix is equal to a value of the curved displacement for eliminating color shift, and the curved displacement is a displacement of one of the color filter photoresists and corresponding one of the pixel electrodes.

In the curved liquid crystal display panel of the present invention, the curved displacement is calculated according to a thickness of the curved color filter substrate, an elastic modulus of the curved color filter substrate, and a curvature radius of the curved color filter substrate.

In the curved liquid crystal display panel of the present invention, the curved displacement is calculated according to:

$$K2=E*P*r/(8*d).$$

K is the curved displacement. E is the elastic modulus of the curved color filter substrate. P is an atmosphere pressure. r is the curvature radius of the curved color filter substrate. d is the thickness of the curved color filter substrate.

In the curved liquid crystal display panel of the present invention, the black matrix is widened only at the left area and the right area according to the curved displacement.

In the curved liquid crystal display panel of the present invention, the color filter photoresists at the left area of the color filter substrate are shifted left corresponding to the corresponding pixel electrodes of the array substrate, while the color filter photoresists at the right area of the color filter substrate are shifted right corresponding to the corresponding pixel electrodes of the array substrate.

In the curved liquid crystal display panel of the present invention, the color filter photoresists comprise red color filters, green color filters, and blue color filters.

In the curved liquid crystal display panel of the present invention, the pixel electrodes are disposed corresponding to the color filter photoresists.

A curved liquid crystal display panel in accordance with an embodiment of the present invention comprises: a color filter substrate comprising a black matrix and color filter photoresists disposed thereon; an array substrate disposed corresponding to the curved color filter substrate and having pixel electrodes and data lines disposed thereon, wherein each of the pixel electrodes has a first side and a second side, a length of the first side is greater than a length of the second side, and a curved direction of the curved liquid crystal display panel is the same as an extending direction of the first side; and a liquid crystal layer disposed between the color filter substrate and the array substrate.

In the curved liquid crystal display panel of the present invention, the black matrix is widened according to a curved displacement, a widening value of the black matrix is equal to a value of the curved displacement for eliminating color shift, and the curved displacement is a displacement of one of the color filter photoresists and corresponding one of the pixel electrodes.

In the curved liquid crystal display panel of the present invention, the curved displacement is calculated according to a thickness of the curved color filter substrate, an elastic modulus of the curved color filter substrate, and a curvature radius of the curved color filter substrate.

In the curved liquid crystal display panel of the present invention, the curved displacement is calculated according to:

$$K2=E*P*r/(8*d).$$

K is the curved displacement. E is the elastic modulus of the curved color filter substrate. P is an atmosphere pressure. r is the curvature radius of the curved color filter substrate. d is the thickness of the curved color filter substrate.

In the curved liquid crystal display panel of the present invention, the curved liquid crystal display panel comprises a left area, a middle area, and a right area, and the black matrix is widened only at the left area and the right area according to the curved displacement.

The present invention further provides a curved liquid crystal display device. The curved liquid crystal display device comprises a backlight module and a curved liquid crystal display panel. The curved liquid crystal display panel comprises: a color filter substrate comprising a black matrix and color filter photoresists disposed thereon; an array substrate disposed corresponding to the curved color filter substrate and having pixel electrodes and data lines disposed thereon, wherein each of the pixel electrodes has a first side and a second side, a length of the first side is greater than a length of the second side, and a curved direction of the curved liquid crystal display panel is the same as an extending direction of the first side; and a liquid crystal layer disposed between the color filter substrate and the array substrate.

In the curved liquid crystal display device of the present invention, the black matrix is widened according to a curved displacement, a widening value of the black matrix is equal to a value of the curved displacement for eliminating color shift, and the curved displacement is a displacement of one of the color filter photoresists and corresponding one of the pixel electrodes.

In the curved liquid crystal display device of the present invention, the curved displacement is calculated according to a thickness of the curved color filter substrate, an elastic modulus of the curved color filter substrate, and a curvature radius of the curved color filter substrate.

In the curved liquid crystal display device of the present invention, the curved displacement is calculated according to:

$$K2=E*P*r/(8*d).$$

K is the curved displacement. E is the elastic modulus of the curved color filter substrate. P is an atmosphere pressure. r is the curvature radius of the curved color filter substrate. d is the thickness of the curved color filter substrate.

In the curved liquid crystal display device of the present invention, the curved liquid crystal display panel comprises a left area, a middle area, and a right area, and the black matrix is widened only at the left area and the right area according to the curved displacement.

The curved liquid crystal display panel and the curved liquid crystal display device of the present invention decrease the color shift by arranging the curved direction of the curved liquid crystal display panel the same as the extending direction of the long side of pixel electrodes. As a result, the color shift phenomenon and the light leakage phenomenon due to the misalignment between the color filter substrate and the array substrate in the prior art are eliminated, and thus the display quality of the liquid crystal display device is improved.

For a better understanding of the aforementioned content of the present invention, preferable embodiments are illustrated in accordance with the attached figures for further explanation:

DETAILED DESCRIPTION OF THE INVENTION

Figure 1:
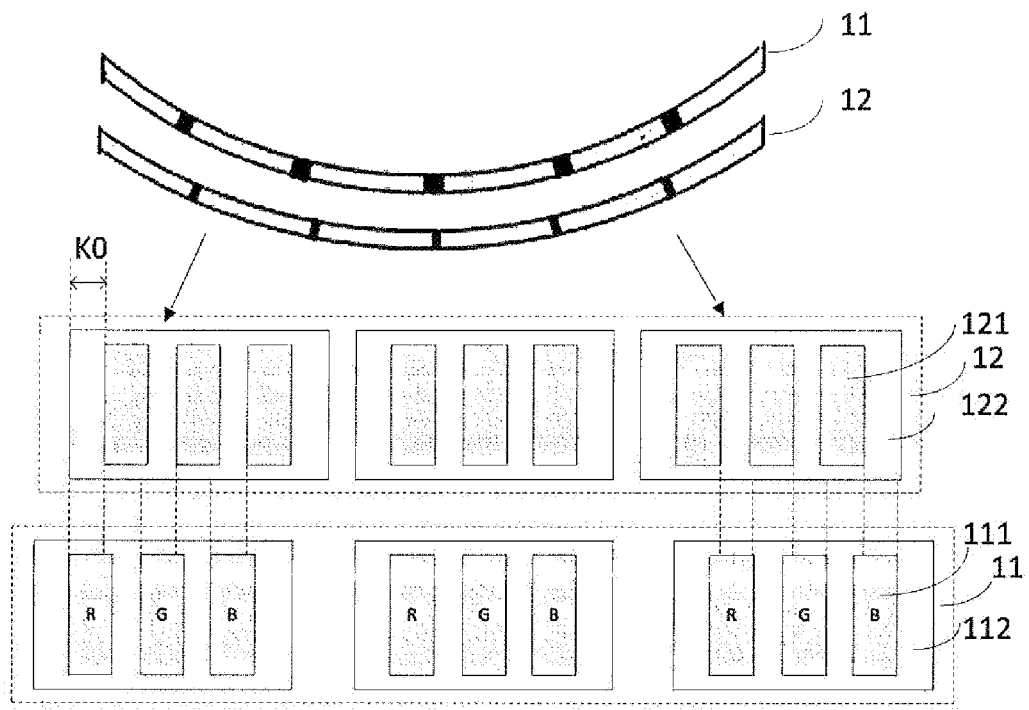
FIG. 1 shows a structural diagram of a curved liquid crystal display panel and a part of the structural diagram in the prior art.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Figure 2:
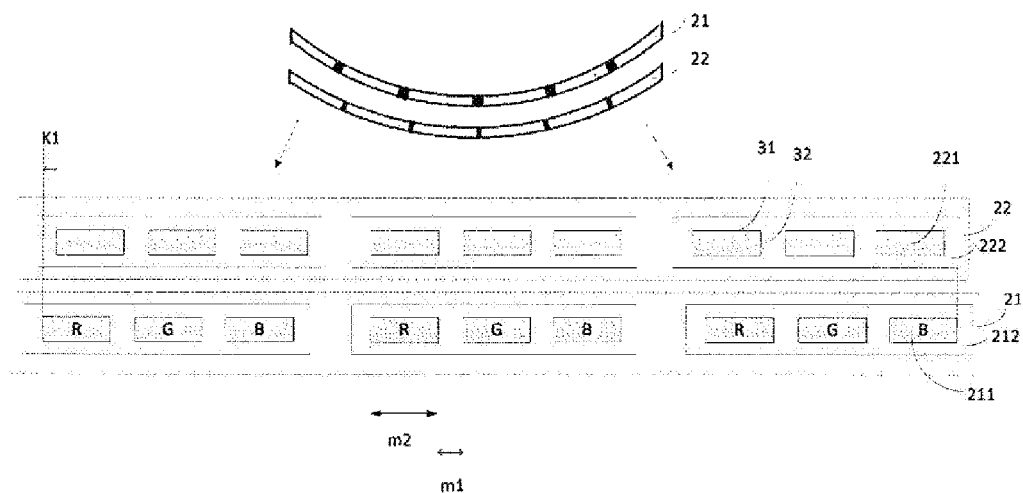
FIG. 2 shows a structural diagram of a curved liquid crystal display panel and a part of the structural diagram in accordance with a first preferred embodiment of the present invention.

Please refer to FIG. 2. FIG. 2 shows a structural diagram of a curved liquid crystal display panel and a part of the structural diagram in accordance with a first preferred embodiment of the present invention.

In the present preferred embodiment, the curved liquid crystal display panel comprises a curved color filter substrate 21, a curved array substrate 22, and a liquid crystal layer disposed between the curved color filter substrate 21 and the curved array substrate 22. Specific structures of the curved color filter substrate 21 and the curved array substrate 22 are shown in the upper part of FIG. 2.

As shown in the lower part of FIG. 2, a black matrix 212 and color filter photoresists 211 are disposed on the curved color filter substrate 21. The color filter photoresists 211 comprise red color filters R, green color filters G, and blue color filters B and may further white color filters and yellow color filters. The curved array substrate 22 is disposed corresponding to the curved color filter substrate 21. The curved array substrate 22 has pixel electrodes 221, data lines 122, and scan lines (not shown) disposed thereon.

In a flat state, the pixel electrodes 221 of the curved array substrate 22 are disposed corresponding to the color filter photoresists 211 of the curved color filter substrate 21 (i.e. in a one-to-one relationship), such that each pixel can display red light, green light, and blue light via the color filter substrate 21.

Since the curved array substrate 22 is disposed corresponding to the color filter substrate 21, the color filter photoresists 211 at two sides of the color filter substrate 21 and the corresponding pixel electrodes 221 on the array substrate 22 have displacements as shown in the lower part of FIG. 2. The color filter photoresists 211 at the left side of the color filter substrate 21 are shifted left corresponding to the corresponding pixel electrodes 221 of the array substrate 22, while the color filter photoresists 211 at the right side of the color filter substrate 21 are shifted right corresponding to the corresponding pixel electrodes 221 of the array substrate 22.

In order to avoid the color shift phenomenon or the light leakage phenomenon, each of the pixel electrodes 221 has a first side 31 (a long side) and a second side 32 (a short side) in the cured liquid crystal display panel of the present preferred embodiment. A length of the first side 31 is greater than a length of the second side 32. In the present invention, a curved direction of the curved liquid crystal display panel is the same as an extending direction of the first side 31. The curved liquid crystal display panel is manufactured by curving a liquid crystal display panel with a flat structure in the direction of the long side of the pixel electrodes 221.

Because the pixel electrodes 221 are disposed corresponding to the color filter photoresists 211, the curved direction of the curved liquid crystal display panel is the same as a direction of a long side of each color filter photoresist 211. In the prior art, a liquid crystal display panel with a flat structure is curved in a direction of a short side of a pixel electrode. The present embodiment utilizes the above-mentioned curved method, such that the black matrix per unit area is decreased. That is, a ratio of a width m1 between two color filter photoresists 211 to a width m2 of a color filter photoresist 211 is decreased. In the prior art, m2 is a length of a short side of a color filter photoresist 111. When the color filter photoresists 211 of the color filter substrate 21 are shifted corresponding to the corresponding pixel electrodes 221, a displacement K1 of a pixel electrode 221 and a color filter photoresist 211 can be decreased, thereby avoiding the color shift phenomenon and the light leakage phenomenon due to the displacements of the pixel electrodes 221 and the color filter photoresists 211.

In the curved liquid crystal display panel of the present invention, the curved direction of the curved liquid crystal display panel is the same as the extending direction of the long side of the pixel electrodes 221. As a result, the color shift can be decreased, and the light leakage phenomenon can be avoided.

Figure 3:
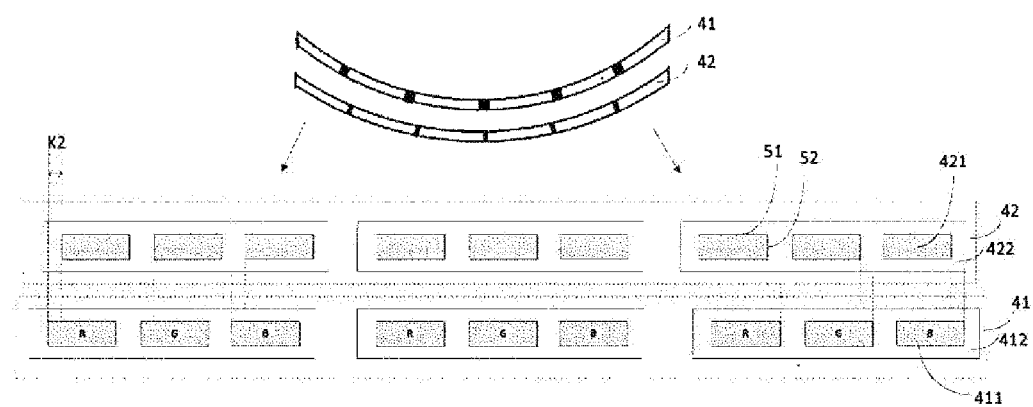
FIG. 3 shows a structural diagram of a curved liquid crystal display panel and a part of the structural diagram in accordance with a second preferred embodiment of the present invention.

Please refer to FIG. 3. FIG. 3 shows a structural diagram of a curved liquid crystal display panel and a part of the structural diagram in accordance with a second preferred embodiment of the present invention.

In the present preferred embodiment, the curved liquid crystal display panel comprises a curved color filter substrate 41, a curved array substrate 42, and a liquid crystal layer disposed between the curved color filter substrate 41 and the curved array substrate 42. Specific structures of the curved color filter substrate 41 and the curved array substrate 42 are shown in the upper part of FIG. 3.

As shown in the lower part of FIG. 3, a black matrix 412 and color filter photoresists 411 are disposed on the curved color filter substrate 41. The color filter photoresists 411 comprise red color filters R, green color filters G, and blue color filters B. The curved array substrate 42 is disposed corresponding to the curved color filter substrate 41. The curved array substrate 42 has pixel electrodes 421, data lines 422, and scan lines (not shown) disposed thereon.

In a flat state, the pixel electrodes 421 of the curved array substrate 42 are disposed corresponding to the color filter photoresists 411 of the curved color filter substrate 41 (i.e. in a one-to-one relationship), such that each pixel can display red light, green light, and blue light via the color filter substrate 41.

Since the curved array substrate 42 is disposed corresponding to the color filter substrate 41, the color filter photoresists 411 at two sides of the color filter substrate 41 and the corresponding pixel electrodes 221 on the array substrate 22 have displacements as shown in the lower part of FIG. 3. The color filter photoresists 411 at the left side of the color filter substrate 41 are shifted left corresponding to the corresponding pixel electrodes 421 of the array substrate 42, while the color filter photoresists 411 at the right side of the color filter substrate 41 are shifted right corresponding to the corresponding pixel electrodes 421 of the array substrate 42.

In the present invention, a curved direction of the curved liquid crystal display panel may be the same as an extending direction of a long side 51 of a pixel electrode 221. The curved direction of the curved liquid crystal display panel may be the same as an extending direction of a short side 52 of the pixel electrode 221 as well. That is, the curved liquid crystal display panel is manufactured by curving a liquid crystal display panel with a flat structure in the directions of the long side or the short side of the pixel electrode 221.

A curved displacement K2 is defined as a displacement of a color filter photoresist 411 and a corresponding pixel electrode 421. A derivation process of the curved displacement K2 is as follows.

Figure 4:
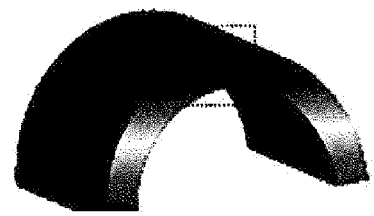
FIG. 4 shows that a front view of a small cube when the curved liquid crystal display panel in accordance with the second preferred embodiment of the present invention is divided into infinite cubes.

As shown in FIG. 4, the curved color filter substrate 41 is a semi-circle structure. The curved color filter substrate 41 with the semi-circle structure is divided into infinite small cubes. A dotted-line portion represents a front view of a small cube after the curved color filter substrate 41 with the semi-circle structure is divided. A pressure of the color filter substrate 41 is calculated as the following formula 1:

$$P = F/S. \quad \text{formula 1}$$

P is the pressure of the atmosphere and usually is a standard atmosphere pressure. F is a pressure applied to the color filter substrate 41. S is a forced area.

Figure 5:
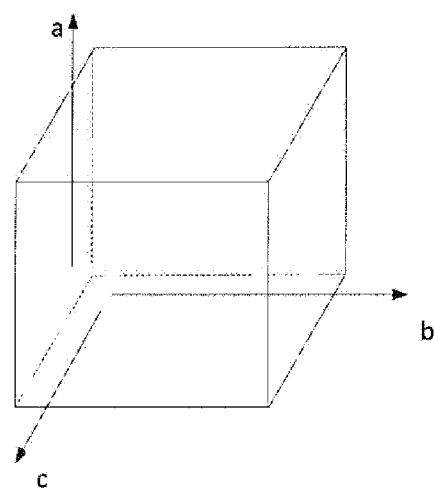
FIG. 5 shows a free-body diagram of the small cube in FIG. 4.
Figure 6:
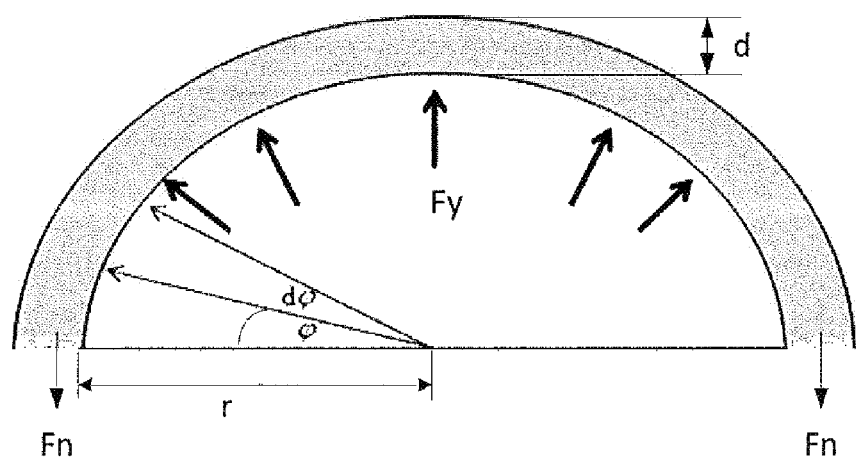
FIG. 6 shows an integration of the curved liquid crystal display device of the present invention.

FIG. 5 shows a free-body diagram of the small cube. Forces in directions a, b, and c are applied to the small cube. a is the curved direction of the curved liquid crystal display panel. b is a normal direction of the curved direction of the curved liquid crystal display panel. c is a direction out of the paper. $\sigma_a$ is a force applied to the small cube per unit in the direction a. $\sigma_b$ is a force applied to the small cube per unit in the direction b. $\sigma_c$ is a force applied to the small cube per unit in the direction c. Please refer to FIG. 5 and FIG. 6. When the color filter substrate 41 is curved, the force applied to the color filter substrate 41 is divided into forces Fn applied to the two sides and a force applied to the middle Fy. In a usual condition, the middle of the color filter substrate 41 is not forced. Accordingly, the following formula 2 is as follows:

$$\Sigma Fy = 0. \quad \text{formula 2}$$

The force applied to the small cube is acquired by integrating the arc surface of the curved color filter substrate 41 with a surface integration method:

$$\int_0^\pi P*L*\frac{D}{2}\sin\varphi\,d\varphi = P*L*D. \quad \text{formula 3}$$

L is a length of the curved color filter substrate 41. D is a curvature diameter of the curved color filter substrate 41. d is a thickness of the curved color filter substrate 41. φ is a center angle of the curved color filter substrate 41. The force applied to the small cube per unit in the direction a is:

$$Fa=\sigma_a*d*L. \quad \text{formula 4}$$

Since the small cube is forced by only two forces Fn, twice the force per unit in the direction a is the same as the force applied to the cube. That is, the formula 3 is equal to the formula 4:

$$2\sigma_a*d*L-P*L*D=0. \quad \text{formula 5}$$

Then, the formula 5 is simplified as:

$$\sigma_a = \frac{PD}{2d}. \quad \text{formula 6}$$

Correspondingly, a total force applied to the color filter substrate is F0:

$$F0=p*\pi*(D/2)^2. \quad \text{formula 7}$$

An area Sb of the curved color filter substrate 41 in the direction b is:

$$Sb=\pi D*d. \quad \text{formula 8}$$

The force applied to the small cube per unit in the direction b is calculated according to the formulas 7 and 8:

$$\sigma_b=F0/Sb=p*\pi*(D/2)^2/(\pi D*d)=PD/4d=Pr/8d. \quad \text{formula 9}$$

The force applied to the curved color filter substrate 41 in the direction out of the paper is:

$$\sigma_c=0. \quad \text{formula 10}$$

An elastic modulus of the curved color filter substrate 41 is E. When the curved color filter substrate 41 is curved, an elastic deformation occurs. According to Hooke's law, the curved displacement K2 caused by the force (deformation force) which is applied to the pixel electrode 421 and the color filter photoresist 411 in the direction b can be calculated by:

$$K2=E\cdot\sigma_b. \quad \text{formula 11}$$

The curved displacement K2 can be calculated by combining the formulas 9 and 11:

$$K2=E*P*r/(8*d). \quad \text{formula 12}$$

K2 is the curved displacement, and a unit of K2 is meter. E is the elastic modulus of the curved color filter substrate 41, and a unit of E is megapascal (MPa). P is the atmosphere pressure, and a unit of P is pascal. P usually means the standard atmosphere pressure. r is the curvature radius of the curved color filter substrate 41, and a unit of r is meter. d is the thickness of the curved color filter substrate 41, and a unit of d is meter.

That is, the curved displacement is calculated according to the thickness of the curved color filter substrate 41, the elastic modulus of the curved color filter substrate 41, and the curvature radius of the curved color filter substrate 41. When the liquid crystal display panel with the flat structure is curved, the pixel electrodes 421 and the color filter photoresists 411 have the displacements. Accordingly, the black matrix 412 is widened according to the curved displacement K2. A widening value of the black matrix 412 is equal to a value of the curved displacement K2. By widening the black matrix 412, the pixel electrodes 421 are realigned with the color filter photoresists 411 in a one-to-one relationship. As a result, the color shift problem of the curved liquid crystal display panel can be avoided. Furthermore, the whole black matrix of the curved liquid crystal display panel can be widened.

The curved liquid crystal display panel comprises the left area, the middle area, and the right area. Since the displacements of the pixel electrode and the color filter photoresists occur only at the left area and the right area, the black matrix is widened only at the left area and the right area according to the curved displacement in one preferred embodiment. The widening value of the black matrix is equal to the value of the curved displacement. The pixel electrodes are realigned with the color filter photoresists in a one-to-one relationship. As a result, the color shift problem of the curved liquid crystal display panel can be avoided. Furthermore, in a general situation, the width of the black matrix is equal to a width of a data line, and the black matrix is disposed corresponding to the data lines. Accordingly, when display device is further curved and a displacement of the color filter substrate and the array substrate is increasing, two adjacent ones of the color filter photoresists are shifted to the data lines. Since an electric field near the data lines drives liquid crystals to rotate, the light leakage phenomenon occurs. Since the black matrix of the present invention is widened, the width of the black matrix is greater than a width of a data line and the light leakage phenomenon can be avoided.

The curved liquid crystal display panel eliminates the color shift phenomenon and the light leakage phenomenon by widening the black matrix.

The present invention further provides a curved liquid crystal display device. The curved liquid crystal display device comprises a curved liquid crystal display panel and a backlight module. The backlight module may comprise a light source and a light guide plate. The light source is utilized for providing emitting light. The light guide plate is utilized for transmitting the emitting light to the curved liquid crystal display panel. The curved liquid crystal display panel comprises a curved color filter substrate, a curved array substrate, and a liquid crystal layer. The liquid crystal layer is disposed between the curved color filter substrate and the curved array substrate.

Color filter photoresists and a black matrix are disposed on the curved color filter substrate. The curved array substrate is disposed corresponding to the curved color filter substrate. The curved array substrate has pixel electrodes and data lines disposed thereon. Each of the pixel electrodes has a first side and a second side. A length of the first side is greater than a length of the second side. A curved direction of the curved liquid crystal display panel is the same as an extending direction of the first side.

The curved liquid crystal display device of the present invention can comprise any one of the above-mentioned curved liquid crystal display panels. Since the curved liquid crystal display panels are described in detail above, the description thereof is omitted herein.

In the curved liquid crystal display device of the present invention, the curved direction of the curved liquid crystal display panel is the same as the extending direction of the long side of the pixel electrodes. As a result, the color shift phenomenon and the light leakage phenomenon can be avoided. Furthermore, the color shift phenomenon and the light leakage phenomenon can be eliminated by widening the black matrix.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A curved liquid crystal display panel, comprising:
a curved color filter substrate comprising a black matrix and color filter photoresists disposed thereon;
a curved array substrate disposed corresponding to the curved color filter substrate and having pixel electrodes and data lines disposed thereon, wherein each of the pixel electrodes has a width and a length, the width is greater than the length, and a curved direction of the curved liquid crystal display panel is the same as an extending direction of the width; and
a liquid crystal layer disposed between the curved color filter substrate and the curved array substrate,
wherein the curved liquid crystal display panel comprises a left area, a middle area, and a right area, the black matrix is widened according to a curved displacement, a widening value of the black matrix is equal to a value of the curved displacement for eliminating color shift, and the curved displacement is a displacement of one of the color filter photoresists and corresponding one of the pixel electrodes,
wherein the pixel electrodes have a one-to-one relationship with the color filter photoresists.

2. The curved liquid crystal display panel of claim 1, wherein the curved displacement is calculated according to a thickness of the curved color filter substrate, an elastic modulus of the curved color filter substrate, and a curvature radius of the curved color filter substrate.

3. The curved liquid crystal display panel of claim 2, wherein the curved displacement is calculated according to:

$$K2=E*P*r/(8*d),$$

K is the curved displacement, E is the elastic modulus of the curved color filter substrate, P is an atmosphere pressure, r is the curvature radius of the curved color filter substrate, and d is the thickness of the curved color filter substrate.

4. The curved liquid crystal display panel of claim 1, wherein the black matrix is widened only at the left area and the right area according to the curved displacement.

5. The curved liquid crystal display panel of claim 1, wherein the color filter photoresists at the left area of the curved color filter substrate are shifted left corresponding to the corresponding pixel electrodes of the curved array substrate, while the color filter photoresists at the right area of the curved color filter substrate are shifted right corresponding to the corresponding pixel electrodes of the curved array substrate.

6. The curved liquid crystal display panel of claim 1, wherein the color filter photoresists comprise red color filters, green color filters, and blue color filters.

7. The curved liquid crystal display panel of claim 1, wherein the pixel electrodes are disposed corresponding to the color filter photoresists.

8. A curved liquid crystal display panel, comprising:
a curved color filter substrate comprising a black matrix and color filter photoresists disposed thereon;
curved array substrate disposed corresponding to the curved color filter substrate and having pixel electrodes and data lines disposed thereon, wherein each of the pixel electrodes has a width and a length, the width is greater than the length, and a curved direction of the curved liquid crystal display panel is the same as an extending direction of the width; and
a liquid crystal layer disposed between the curved color filter substrate and the curved array substrate,
wherein the pixel electrodes have a one-to-one relationship with the color filter photoresists.

9. The curved liquid crystal display panel of claim 8, wherein the black matrix is widened according to a curved displacement, a widening value of the black matrix is equal to a value of the curved displacement for eliminating color shift, and the curved displacement is a displacement of one of the color filter photoresists and corresponding one of the pixel electrodes.

10. The curved liquid crystal display panel of claim 9, wherein the curved displacement is calculated according to a thickness of the curved color filter substrate, an elastic modulus of the curved color filter substrate, and a curvature radius of the curved color filter substrate.

11. The curved liquid crystal display panel of claim 10, wherein the curved displacement is calculated according to:

$$K2=E*P*r/(8*d),$$

K is the curved displacement, E is the elastic modulus of the curved color filter substrate, P is an atmosphere pressure, r is the curvature radius of the curved color filter substrate, and d is the thickness of the curved color filter substrate.

12. The curved liquid crystal display panel of claim 9, wherein the curved liquid crystal display panel comprises a left area, a middle area, and a right area, and the black matrix is widened only at the left area and the right area according to the curved displacement.

13. A curved liquid crystal display device, comprising a backlight module and a curved liquid crystal display panel, the curved liquid crystal display panel comprising:
a curved color filter substrate comprising a black matrix and color filter photoresists disposed thereon;
curved array substrate disposed corresponding to the curved color filter substrate and having pixel electrodes and data lines disposed thereon, wherein each of the pixel electrodes has a width and a length, the width is greater than the length, and a curved direction of the curved liquid crystal display panel is the same as an extending direction of the width; and
a liquid crystal layer disposed between the curved color filter substrate and the curved array substrate,
wherein the pixel electrodes have a one-to-one relationship with the color filter photoresists.

14. The curved liquid crystal display device of claim 13, wherein the black matrix is widened according to a curved displacement, a widening value of the black matrix is equal to a value of the curved displacement for eliminating color shift, and the curved displacement is a displacement of one of the color filter photoresists and corresponding one of the pixel electrodes.

15. The curved liquid crystal display device of claim 14, wherein the curved displacement is calculated according to a thickness of the curved color filter substrate, an elastic modulus of the curved color filter substrate, and a curvature radius of the curved color filter substrate.

16. The curved liquid crystal display device of claim 15, wherein the curved displacement is calculated according to:

$$K2 = E*P*r/(8*d),$$

K is the curved displacement, E is the elastic modulus of the curved color filter substrate, P is an atmosphere pressure, r is the curvature radius of the curved color filter substrate, and d is the thickness of the curved color filter substrate.

17. The curved liquid crystal display device of claim 14, wherein the curved liquid crystal display panel comprises a left area, a middle area, and a right area, and the black matrix is widened only at the left area and the right area according to the curved displacement.

* * * * *